United States Patent
Anand et al.

(10) Patent No.: US 10,942,769 B2
(45) Date of Patent: Mar. 9, 2021

(54) ELASTIC LOAD BALANCING PRIORITIZATION

(71) Applicant: International Business Machines Corporation, Armonk, NY (US)

(72) Inventors: Vaijayanthimala K. Anand, Austin, TX (US); Suryanarayan Ramamurthy, Santa Clara, CA (US); Jimmy Nguyen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/202,152

(22) Filed: Nov. 28, 2018

(65) Prior Publication Data

US 2020/0167189 A1 May 28, 2020

(51) Int. Cl.
*G06F 9/48* (2006.01)
*G06F 9/50* (2006.01)
*G06Q 10/06* (2012.01)

(52) U.S. Cl.
CPC ............ *G06F 9/4881* (2013.01); *G06F 9/505* (2013.01); *G06F 9/5038* (2013.01); *G06F 9/5088* (2013.01); *G06Q 10/06315* (2013.01)

(58) Field of Classification Search
CPC .......... G06F 9/4881; G06F 9/50–5094; G06Q 10/06315
USPC .................................................. 718/102–105
See application file for complete search history.

(56) References Cited

U.S. PATENT DOCUMENTS

| | | | |
|---|---|---|---|
| 7,389,510 B2 | 6/2008 | Forrester | |
| 8,667,500 B1 * | 3/2014 | Ji | G06F 9/5077 718/102 |
| 8,732,312 B2 * | 5/2014 | Minato | G06F 9/5083 709/223 |
| 9,378,044 B1 * | 6/2016 | Gaurav | G06F 9/5077 |
| 9,450,817 B1 * | 9/2016 | Bahadur | H04L 41/0806 |
| 9,501,325 B2 | 11/2016 | Pell et al. | |
| 9,584,594 B2 | 2/2017 | Pell et al. | |
| 9,866,487 B2 | 1/2018 | Roach et al. | |
| 10,157,002 B2 * | 12/2018 | Grube | G06F 3/0619 |

(Continued)

FOREIGN PATENT DOCUMENTS

EP 2241976 A2 10/2010

OTHER PUBLICATIONS

R. B. Antequera et al., "ADON: Application-Driven Overlay Network-as-a-Service for Data-Intensive Science," in IEEE Transactions on Cloud Computing, vol. 6, No. 3, pp. 640-655, Jul.-Sep. 1, 2018. (Year: 2018).*

(Continued)

*Primary Examiner* — Andrew M. Lyons
(74) *Attorney, Agent, or Firm* — Daniel C. Housley

(57) ABSTRACT

In a load balancing environment, a method, system, and computer program product may balance workloads by deploying one or more applications, defining a priority for a first application of the one or more applications, assigning a set of dynamic resources to the first application, configuring a set of burst reserves for the first application, configuring a schedule for the priority for the first application, configuring an elastic load balancer to manage the workload of the first application according to the priority and scheduling using the set of dynamic resources and burst reserves, and executing the one or more applications.

17 Claims, 7 Drawing Sheets

(56) References Cited

U.S. PATENT DOCUMENTS

| | | | |
|---|---|---|---|
| 10,346,775 B1* | 7/2019 | Xu | G06Q 20/145 |
| 10,754,704 B2* | 8/2020 | Rao | G06F 9/5016 |
| 2004/0267897 A1* | 12/2004 | Hill | G06F 9/505 |
| | | | 709/217 |
| 2005/0102676 A1 | 5/2005 | Forrester et al. | |
| 2005/0149940 A1* | 7/2005 | Calinescu | G06F 9/5061 |
| | | | 718/104 |
| 2008/0034370 A1* | 2/2008 | Huizenga | G06F 9/5061 |
| | | | 718/104 |
| 2008/0184254 A1* | 7/2008 | Bernard | G06F 9/505 |
| | | | 718/105 |
| 2008/0239979 A1* | 10/2008 | Chou | G06F 11/3495 |
| | | | 370/252 |
| 2008/0279204 A1* | 11/2008 | Pratt, Jr. | H04W 56/002 |
| | | | 370/406 |
| 2009/0125619 A1* | 5/2009 | Antani | G06Q 10/00 |
| | | | 709/223 |
| 2010/0217866 A1 | 8/2010 | Nandagopal et al. | |
| 2012/0078994 A1* | 3/2012 | Jackowski | H04L 47/24 |
| | | | 709/202 |
| 2012/0109852 A1* | 5/2012 | Lingam | H04L 47/125 |
| | | | 705/400 |
| 2012/0124591 A1* | 5/2012 | Cadambi | G06F 9/505 |
| | | | 718/103 |
| 2013/0031562 A1* | 1/2013 | Gusak | G06F 9/505 |
| | | | 718/105 |
| 2014/0149986 A1* | 5/2014 | S M | H04L 41/5003 |
| | | | 718/1 |
| 2015/0256432 A1* | 9/2015 | Agarwala | G06F 3/0629 |
| | | | 709/214 |
| 2015/0261575 A1 | 9/2015 | Blanding et al. | |
| 2015/0295853 A1 | 10/2015 | Pell et al. | |
| 2015/0296006 A1* | 10/2015 | Pell | G06F 9/5005 |
| | | | 709/226 |
| 2016/0380905 A1* | 12/2016 | Wang | G06F 9/5077 |
| | | | 709/226 |
| 2017/0063674 A1 | 3/2017 | Maskalik et al. | |
| 2017/0199762 A1* | 7/2017 | Bufe, III | G06F 9/4881 |
| 2017/0199770 A1* | 7/2017 | Peteva | G06F 9/5088 |
| 2017/0220389 A1* | 8/2017 | Michael | H04L 67/10 |
| 2017/0366606 A1 | 12/2017 | Ben-Shaul et al. | |
| 2018/0026904 A1* | 1/2018 | Van De Groenendaal | |
| | | | F41G 3/2627 |
| 2018/0048589 A1 | 2/2018 | Kulkarni et al. | |
| 2018/0254999 A1* | 9/2018 | Caffee | H04L 67/32 |
| 2019/0182169 A1* | 6/2019 | Li | G06F 9/5077 |
| 2019/0332440 A1* | 10/2019 | Smaldone | H04L 43/0876 |
| 2019/0342380 A1* | 11/2019 | Thota | G06F 16/2246 |
| 2020/0036817 A1* | 1/2020 | Goyal | H04L 43/10 |
| 2020/0117447 A1 | 4/2020 | Catalano et al. | |

OTHER PUBLICATIONS

S. D. Girase, M. Sohani and S. Patil, "Dynamic resource provisioning in Cloud Computing environment using priority based virtual machine's," 2014 IEEE International Conference on Advanced Communications, Control and Computing Technologies, Ramanathapuram, 2014, pp. 1777-1782. (Year: 2014).*

S. Iserte, R. Mayo, E. S. Quintana-Ortí, V. Beltran and A. J. Peña, "Efficient Scalable Computing through Flexible Applications and Adaptive Workloads," 2017 46th International Conference on Parallel Processing Workshops (ICPPW), Bristol, 2017, pp. 180-189. (Year: 2017).*

A. Kougkas, H. Devarajan, X. Sun and J. Lofstead, "Harmonia: An Interference-Aware Dynamic I/O Scheduler for Shared Non-volatile Burst Buffers," 2018 IEEE International Conference on Cluster Computing (CLUSTER), Belfast, 2018, pp. 290-301. (Year: 2018).*

Y. Li, J. Han and W. Zhou, "Cress: Dynamic Scheduling for Resource Constrained Jobs," 2014 IEEE 17th International Conference on Computational Science and Engineering, Chengdu, 2014, pp. 1945-1952. (Year: 2014).*

E. Meriam and N. Tabbane, "Dynamic Priority Scheduling Protocol Based on Cost in Cloud Computing," 2016 Global Summit on Computer & Information Technology (GSCIT), Sousse, 2016, pp. 15-20. (Year: 2016).*

V. Nikolov, S. Kächele, F. J. Hauck and D. Rautenbach, "CLOUDFARM: An Elastic Cloud Platform with Flexible and Adaptive Resource Management," 2014 IEEE/ACM 7th International Conference on Utility and Cloud Computing, London, 2014, pp. 547-553. (Year: 2014).*

M. Noormohammadpour and C. S. Raghavendra, "Datacenter Traffic Control: Understanding Techniques and Tradeoffs," in IEEE Communications Surveys & Tutorials, vol. 20, No. 2, pp. 1492-1525, Second quarter 2018, doi: 10.1109/COMST.2017.2782753. (Year: 2018).*

J. Son and R. Buyya, "Priority-Aware VM Allocation and Network Bandwidth Provisioning in Software-Defined Networking (SDN)-Enabled Clouds," in IEEE Transactions on Sustainable Computing, vol. 4, No. 1, pp. 17-28, Jan.-Mar. 1, 2019 (first published May 30, 2018), doi: 10.1109/TSUSC.2018.2842074. (Year: 2018).*

Kaur et al., "Load Balancing in Cloud Computing", Proc. of Int. Conf. on Recent Trends in Information, Telecommunication and Computing, ITC, DOI: 02.ITC.2014.5.92, © Association of Computer Electronics and Electrical Engineers, 2014, 8 pages.

Roach et al., "Adaptive Load Balancer Using Software Defined Network (SDN) for Server Data Congestion Avoidance", U.S. Appl. No. 62/008,142, filed Jun. 5, 2014.

Roach et al., "Adaptive Load Balancer and Methods for Intelligent Data Traffic Steering", U.S. Appl. No. 62/117,722, filed Feb. 18, 2015.

Chen et al., "Dynamic Server Cluster Load Balancing in Virtualization Environment with OpenFlow", Received Aug. 4, 2014; Accepted Sep. 8, 2014, School of Information Science and Engineering, Lanzhou University, Research Article, 9 pages.

Mell et al.,"The NIST Definition of Cloud Computing", Recommendations of the National Institute of Standards and Technology, Special Publication 800-145, Sep. 2011, 7 pages.

* cited by examiner

ELASTIC LOAD BALANCING PRIORITIZATION

BACKGROUND

The present disclosure relates generally to the field of workload balancing, and more particularly to workload balancing in an elastic load balancing environment.

In computing environments where elastic load balancers are employed, a number of load balancing algorithms may be used to distribute traffic across nodes where user applications/services run. Businesses may wish to prioritize traffic related to particular applications/services.

SUMMARY

Disclosed herein are embodiments of a method, system, and computer program product for balancing workloads in an elastic load balancing environment.

In a load balancing environment, a method, system, and computer program product may balance workloads by deploying one or more applications, defining a priority for a first application of the one or more applications, assigning a set of dynamic resources to the first application, configuring a set of burst reserves for the first application, configuring a schedule for the priority for the first application, configuring an elastic load balancer to manage the workload of the first application according to the priority and scheduling using the set of dynamic resources and burst reserves, and executing the one or more applications.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
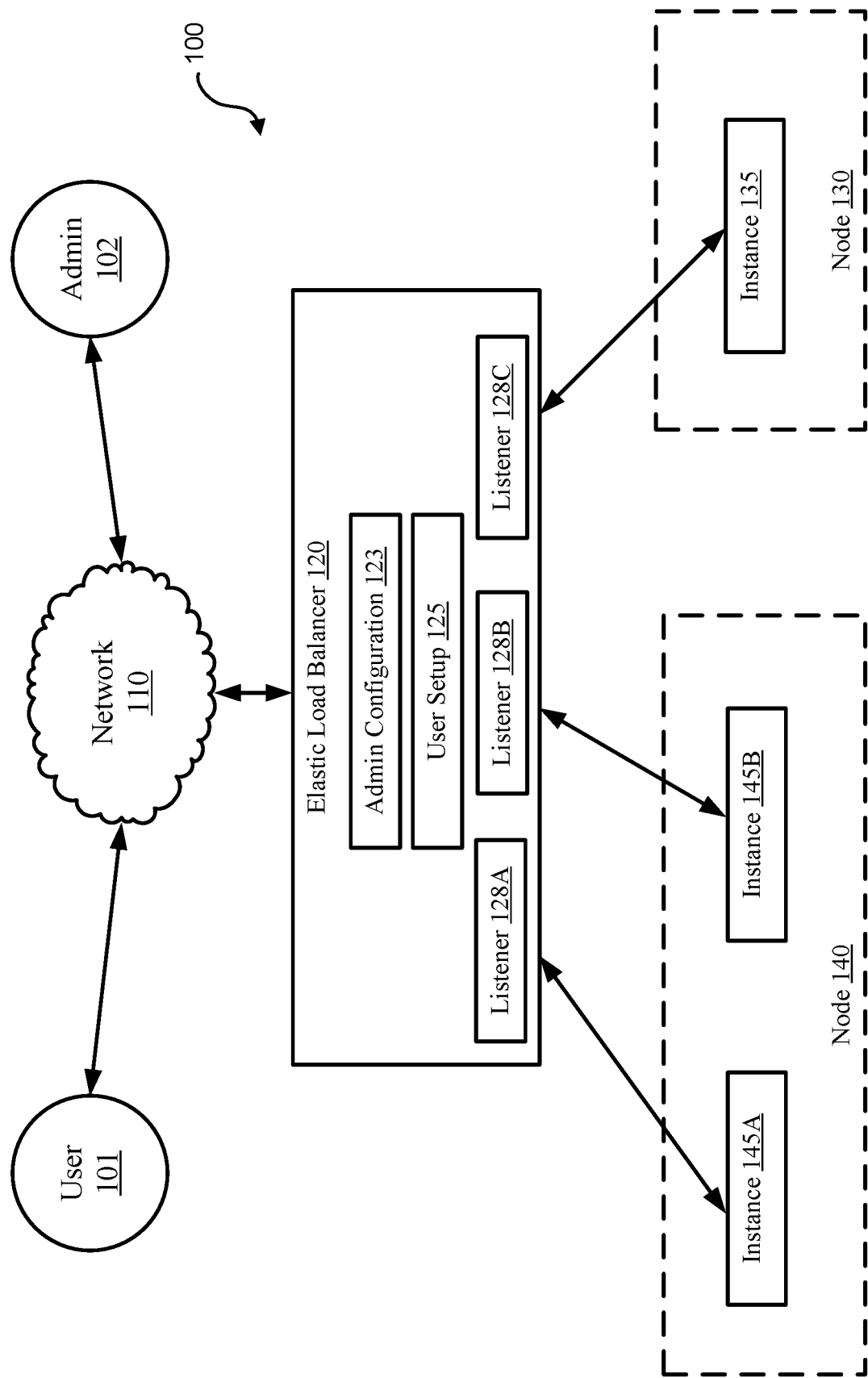
FIG. 1 illustrates a diagram of an example computing environment in which embodiments of the present disclosure may be implemented.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to workload balancing, and more particularly to workload balancing in an elastic load balancing environment. While the present disclosure is not necessarily limited to such applications, various aspects of the disclosure may be appreciated through a discussion of various examples using this context.

Elastic load balancers (ELBs) in cloud environments implement a number of load balancing algorithms to distribute traffic across nodes of back-end servers where user applications and services run. These target nodes may run a variety of applications, and the ELBs allow users to prioritize and fine-tune load balancing of multiple applications by adjusting the listeners managed by a given ELB.

For example, a first cluster of nodes may run a gaming service/application (e.g., an application critical to the business of the user), a second cluster of nodes may run service discovery (also critical to the business of the user), and a third cluster of nodes may run/manage a blog service (not critical to the business of the user). The performance of some of these clusters may be directly linked to the user's business success. Therefore, the user may desire to prioritize the network traffic related to certain applications/services that have the most impact on the user's business. Currently, directly translating business imperatives to technological implementations is imperfect, and unavailable with current load balancers.

In particular, current embodiments for intelligent network traffic management do not consider certain available capacities in the back-end pool of servers/node clusters, the prioritization of applications/services in mixed environments based on policies that reflect business concerns related to the applications deployed in the back-end pool, or service level agreement guarantees. By enforcing application prioritizations (e.g., by taking run-time metrics of the back-end pool and adjusting policies/traffic at the ELB accordingly), the present disclosure provides a marked improvement to the technical field of elastic load balancing.

Because ELBs dynamically scale up/down based on overall load, it is prudent to share ELB resources across multiple applications and services. Not all applications have equal value or business impact—some are more critical to a user's business than others. Most of the current algorithms for load balancing do not take into consideration the run-time characteristics of the back-end pool.

Network load balancers (e.g., "layer 4" load balancers) may be suitable for some predictable traffic scenarios; however, they are less effective when dealing with unexpected server loads (e.g., traffic spikes). Application load balancers (e.g., "layer 7" load balancers) may distribute requests to the most available node/server of the back-end pool. However, this addresses neither the priority of the traffic itself (e.g., whether the traffic includes real-time data, sensitive data, video/audio streams, business imperative-related data, etc.), nor does it address the characteristics of the servers/nodes themselves to optimize the resources of the back-end pool.

The present disclosure describes setting policies for addressing priority levels for the applications using business imperatives as guidelines, addressing the ELB and load balancer service, and also employing heuristics and feedback loops between the ELB and back-end pool to use dynamic run-time characteristics to steer and fine-tune the workload distribution, application prioritizations, network traffic policies, etc. Using these methods, embodiments of the present disclosure may effectively balance network traffic based on business imperatives, as well as more effectively use the back-end pool's resources.

More particularly, embodiments of the present disclosure may use deployment of multiple applications across multiple clusters (e.g., multiple nodes of the back-end pool) and therefore use an ELB to steer/manage network traffic and enforce the priorities set in both the admin-defined ELB configuration and user-defined policy. Embodiments of the present disclosure may further use the analytics derived from run-time monitoring of the listeners of the ELB, as well as the dynamic resources of the back-end pool to mitigate any problems (e.g., failures among the hypervisors/servers/components running in the back-end pool, connection failures among cloud components, etc.). In embodiments, the analytics may also be used to predict possible load spikes and other issues.

When an application is deployed, the application owner (e.g., the user) may configure the application's policy to address the prioritization of the application in relation to other owner-related applications in the same environment. The policy may define the non-exhaustive list of items: 1) general application priorities (e.g., a ranking of owner-related applications, according to priority), 2) a percentage of system capacity an application is entitled to (e.g., the number of CPUs, amount of memory, and a measurement of bandwidth that an application will ideally use), 3) whether elastic load balancing should be enabled, 4) the percentage of the back-end pool's capacity that should be reserved for "bursts" (e.g., spikes in network traffic due to anomalies, end-user engagements, potential traffic-based threats, etc.), and 5) critical time slots for priority application (e.g., periods of time that are projected to have increased network traffic and/or demands on the resources of the back-end pool).

The priority-based policy may be enforced not only in the manner in which the ELB distributes the traffic, but also in the ELB service that does a number of administrative functions automatically and/or in the background of the ELB's normal functioning. Such operations may include: 1) "health" monitoring of the back-end pool (e.g., whether nodes/servers and/or their components failing, whether there is scheduled maintenance, etc.) via run-time metrics monitoring and mitigating actions in response thereto, 2) handling alerts to users and/or end-users of particular applications if there is an issue/problem detected in the back-end pool, 3) monitoring workloads and determining if scaling up/down is required (e.g., determining whether more resources should be dedicated/assigned to the nodes of the back-end pool, or whether virtual instance migration is required to maintain/achieve business imperatives, etc.), 4) monitoring loads on each listener to determine whether the associated nodes should be scaled up/down and to determine priorities as they relate to listeners, 5) analyzing recorded run-time metrics/data to identify trends/patterns that may be used to trigger mitigating actions and enforce policies, and 6) recovering and/or migrating the workloads associated with a failed node. In embodiments, trends identified in similar, but non-owner associated, environments (e.g., applications of businesses that are similar to the owner's, but outside of the owner's control) may be used to preempt/predict policy adjustments that may be needed in owner-associated environments.

In embodiments, the ELB may need to correlate the policies and identify the connections servicing the high priority applications. Queues at the network layer, as well as the ELB, may need to process requests from the connections prior to processing lower priority requests. Ratios may be set for various priority levels and may be used to manage request processing among the various applications. The ELB may, in embodiments, further implement optimizations in terms of CPU and memory allocations to various virtual instances, as well as bandwidth allocations.

Extensions/expansions to currently-available ELB services are needed to achieve the prioritizations envisioned in the present disclosure, and for the business imperative achievements, in particular. Business imperative achievements may require insight derivation via data monitoring/analyzing of the listeners and/or virtual instances servicing the various applications, and sending reports to the ELB to fine-tune how the ELB balances network traffic in order to achieve the quality of service needed for the high priority workloads. The ELB service may 1) identify the listeners that service the high priority workloads, 2) set the priority of the listeners' processes, 3) assign/allocate/bind back-end pool resources (e.g., CPUs, memory, etc.) to the listeners, 4) set network traffic policies to favor the connections created/used by the listeners, and 5) create heuristics for the listeners that may be used to apply fine-tuning measures or dynamically adjust priorities. Based on the priorities, the ELB may also identify the individual back-end servers/nodes that service the high priority workloads/applications and trigger an alert when a potential issue/failure/problem occurs, or when a recovery action is implemented to minimize disruptions (e.g., a migration event in anticipation of maintenance, in response to a failure of a node/server, etc.). In embodiments, the ELB service may also, automatically, take corrective actions, when the application owner has enabled the ELB to do so.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service deliver for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

As discussed above, aspects of the disclosure may relate to the field of workload balancing, and more particularly to workload balancing in an elastic load balancing environment. Accordingly, an understanding of the embodiments of the present disclosure may be aided by describing examples of a computing environment for an elastic load balancing system and an example of a method for implementing embodiments of the present disclosure.

Referring now to FIG. 1, illustrated is a diagram of an example computing environment 100 in which embodiments of the present disclosure may be implemented. Computing environment 100 may include, for example, a cloud computing environment where an elastic load balancer (ELB) 120 manages network traffic and workloads among virtual instances 145A, 145B and 135 among nodes 140 and 130 of a back-end pool.

User 101 may be an individual, a business, a corporate officer, or any other entity capable of owning one or more applications that may be deployed in computing environment 100. User 101 may control certain aspects of the computing environment 100, such as, for example, application priorities defined in user setup 125. User 101 may further control certain software settings for ELB 120 that relate to application priorities and certain network traffic policies related to user 101's applications.

Admin 102 may be another individual, business, entity, etc. that owns or manages the actual computing environment 100. In embodiments, admin 102 and user 101 may the same individual or employed by the same entity. Admin 102 may control other aspects of computing environment 100, such as, for example, the physical hardware associated with computing environment 100, the ELB 120, and the admin configuration 123 of the ELB 120. Admin configuration 123 may include hardware and/or firmware settings, as well as limited software settings for ELB 120 that are not controlled by user 101.

ELB 120 can implement network traffic policies, resource management policies, fine-tuning operations, etc. in order to provide prioritization and optimization for the workload balancing processes. In embodiments, ELB 120 may include, among other components, admin configuration 123, user setup 125, and listeners 128A-C.

Admin configuration 123 may include, for example, the hardware/firmware/software settings that the Admin 102 desires to enforce in the computing environment 100. Such hardware/firmware/software settings may include, for example, access privileges tailored to various users, including user 101; virtualization parameters (e.g., a cap on the number of virtual instances that may be managed by ELB 120, the number and type of resources that any one user/user may procure, etc.); or any other configuration or limitation that admin 102 may desire to enforce in the computing environment 100.

User setup 125 may include, for example, user 101's desired configuration for the portion of the computing environment 100 that user 101 has licensed from admin 102. For example, user setup 125 may include a portfolio of applications, as well as the settings required to operate those applications, policies to be enforced upon end-users' activities; business imperatives and other prioritization-related data; etc.

Listeners 128A-C may include one or more processes that check for connection requests to the nodes 130 and 140 and/or virtual instances 145A-B and 135 in the back-end pool using the protocol and port that may be defined by either user setup 125 or admin configuration 123. User setup 125 may include rules/policies that determine how the ELB 120 may route requests to the nodes 130 and 140 and/or virtual instances 145A-B and 135 and otherwise manage network traffic policies within the computing environment 100. In embodiments, user setup 125 may include a list of business imperatives that the user 101 desires to be achieved, and those business imperatives may be used to create the aforementioned rules/policies.

User 101, admin 102, and ELB 120 may be distant from each other and communicate over a network 110. In some embodiments, ELB 120 may be part of a central hub from which user 101 and admin 102 can establish a communication connection, such as in a client-server networking model. Alternatively, ELB 120 and user 101 and admin 102 may be configured in any other suitable networking relationship (e.g., in a peer-to-peer configuration or using any other network topology). In some embodiments, ELB 120 and nodes 130 and 140 may also be distant from each other and likewise communicate over a similar, or the same, network.

In some embodiments, the network 110 can be implemented using any number of any suitable communications media. For example, the network 110 may be a wide area network (WAN), a local area network (LAN), an internet, or an intranet. In certain embodiments, the user 101, admin 102 and ELB 120 may be local to each other and communicate via any appropriate local communication medium. For example, the user 101, admin 102 and ELB 120 may communicate using a local area network (LAN), one or more hardwire connections, a wireless link or router, or an intranet. In some embodiments, the user 101, admin 102 and ELB 120 may be communicatively coupled using a combination of one or more networks and/or one or more local connections. For example, admin 102 may be hardwired to ELB 120 (e.g., connected with an Ethernet cable) while the user 101 may communicate with the host device using the network 110 (e.g., over the Internet).

In some embodiments, the network 110 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 110.

Nodes 130 and 140 may be servers in a back-end pool of servers. In embodiments, nodes 130 and 140 may be virtualized servers, or portions of servers working together to service one or more applications. Nodes 130 and 140 may include virtual instances (e.g., virtual computers created for purposes defined by user 101 via user setup 125, or to execute a particular application under the control of user 101). Virtual instances (also referred to as simply "instances") 145A-C may execute any number or type of applications deployed by user 101, such as, for example, gaming applications, media streaming applications, blogging applications, etc. Instances 135 and 145A-B may collectively coordinate to run a single application, each instance may run a different application singly, and/or each may run multiple applications at the same time.

While FIG. 1 illustrates an example computing environment 100 with a single user 101, a single admin 102, a single network 110, a single ELB 120 (including a single admin configuration 123, a single user setup 125, and three listeners 128A-C), and two nodes 130 (including instance 135) and 140 (including instances 145A-B), embodiments of this disclosure may include any number of aforementioned objects. The various models, modules, systems, and components discussed in relation to FIG. 1 may exist, if at all, across a plurality of computing devices, networks, etc. For example, some embodiments may include two users, three nodes, and multiple/various numbers of listeners and instances.

Figure 2:
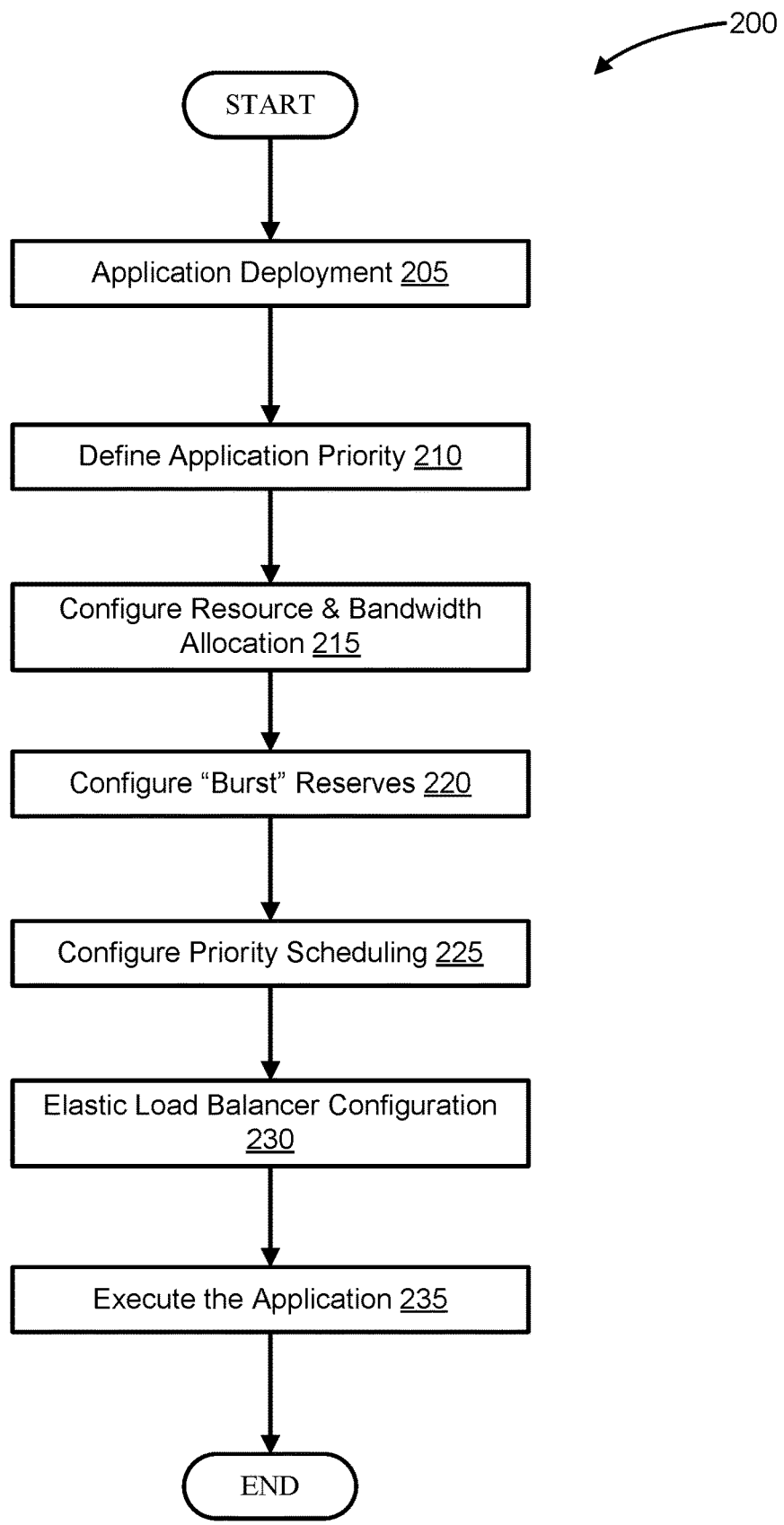
FIG. 2 illustrates a flowchart of a method for deploying and executing an application in an environment managed by an elastic load balancer, according to an embodiment of the present invention.

Turning now to FIG. 2, illustrated is a method 200 for deploying and executing an application in an environment managed by an elastic load balancer, according to an embodiment of the present disclosure. At 205, an application is deployed. As described herein, an application may relate to any service that a particular application owner (e.g., user 101 of FIG. 1) desires to implement. Applications may include games, media streaming services, blog hosting services, content storage management, etc. In embodiments, access to the deployed applications may be offered to end users as part of a business venture.

At 210, an application priority is defined. The application's owner may wish to prioritize the applications under its control in order to better accomplish the owner's goals (e.g., fulfill business imperatives). For example, as described herein, the application owner may have certain business imperatives that are best-served by prioritizing high-value applications (e.g., applications that may drive revenue, or that may provide critical infrastructure or services to the business, etc.) over less-valuable applications (e.g., applications that may drive less revenue or are otherwise non-critical applications).

At 215, resource and bandwidth allocations are configured. The resources (e.g., CPUs/memory) and bandwidth that a particular application may be entitled to may be defined either by an administrator of the ELB, the owner of the application, or by a combination of both. For example, an administrator may enforce a cap on the number of CPUs or the amount of memory or bandwidth that any one application may reserve and utilize, and the owner of the application may license a specific set of resources and bandwidth (e.g., a dedicated allocation of 5 CPU cores with 32 GB of RAM; 250 MB of traffic per week).

At 220, "burst" reserves are configured. "Burst" reserves may be resources that are intentionally left undedicated to a particular node or application, and instead are used to dynamically bridge gaps that may occur between available resources for a particular application (e.g., "supply" of resources for an application) and intermittent "spikes" or demand related to a specific application (e.g., "demand" for an application). Disparities between "supply" and "demand" for an application may occur for any number of reasons. For example, in the context of a gaming application, when an update to the gaming application is implemented, end users may need to download a patch or other content related to the update. In such cases, network traffic for the gaming application may be increased in the period of time shortly following the implementation of the update. Because several end users may be downloading the patch at the same time, and because several users may be simultaneously interested in the new content offered by the update/patch, network traffic related to that particular gaming application may be significantly increased for a time. Because the normal resource allocation for that gaming application may be insufficient to handle the increased traffic, "burst" reserves may provide a temporary stop-gap to handle the amount of "demand" that could otherwise crash a server/node dedicated to said application. Similarly, "burst" reserves may be used to address not only the increased demands that may be intermittent, yet expected (e.g., application maintenance, updates, etc.), but also to address unexpected or catastrophic events, such as hardware failures or intrusion attempts that may incapacitate nodes in the back-end pool for varying, and unpredictable, lengths of time. In embodiments, a single "burst" reserve may service multiple applications and/or nodes.

At 225, priority scheduling is configured. Priority scheduling may refer to the concept that certain applications will inherently, and routinely, experience increased traffic demands at particular points of the day/week/month. For example, gaming applications may experience increased demands outside of the normal workday hours for a given location, during weekends, during holidays, etc. Applications that support business functions (e.g., collaboration channels, intranet forums, e-mail handlers, etc.) may experience increased traffic during normal workday hours, and may perhaps experience an increase in traffic within the first hour of a workday, or shortly before the end of the workday. To address such traffic disparities, priority scheduling may allow the ELB to predict such trends and proactively allocate additional resources to the instances servicing applications that are expected to experience increased traffic demands.

At 230, the ELB is configured, according to the application priority and the schedule for the priority, to use the set of dynamic resources and burst reserves to achieve the application owner's business imperatives. Configuring the ELB may include instructing the load balancer to use an elastic load balancing algorithm when establishing a network traffic policy. An elastic load balancing algorithm, as described herein, may include distributing traffic (e.g., using any of a variety of methods, including round-robin, striping, least connection, session persistence, etc.) and scaling resources dedicated to various instances up/down to meet the traffic demands.

At 235, the application is executed. Execution of the application may include full implementation of the application and making it available to a potential pool of end users (e.g., bringing the application "live").

Figure 3:
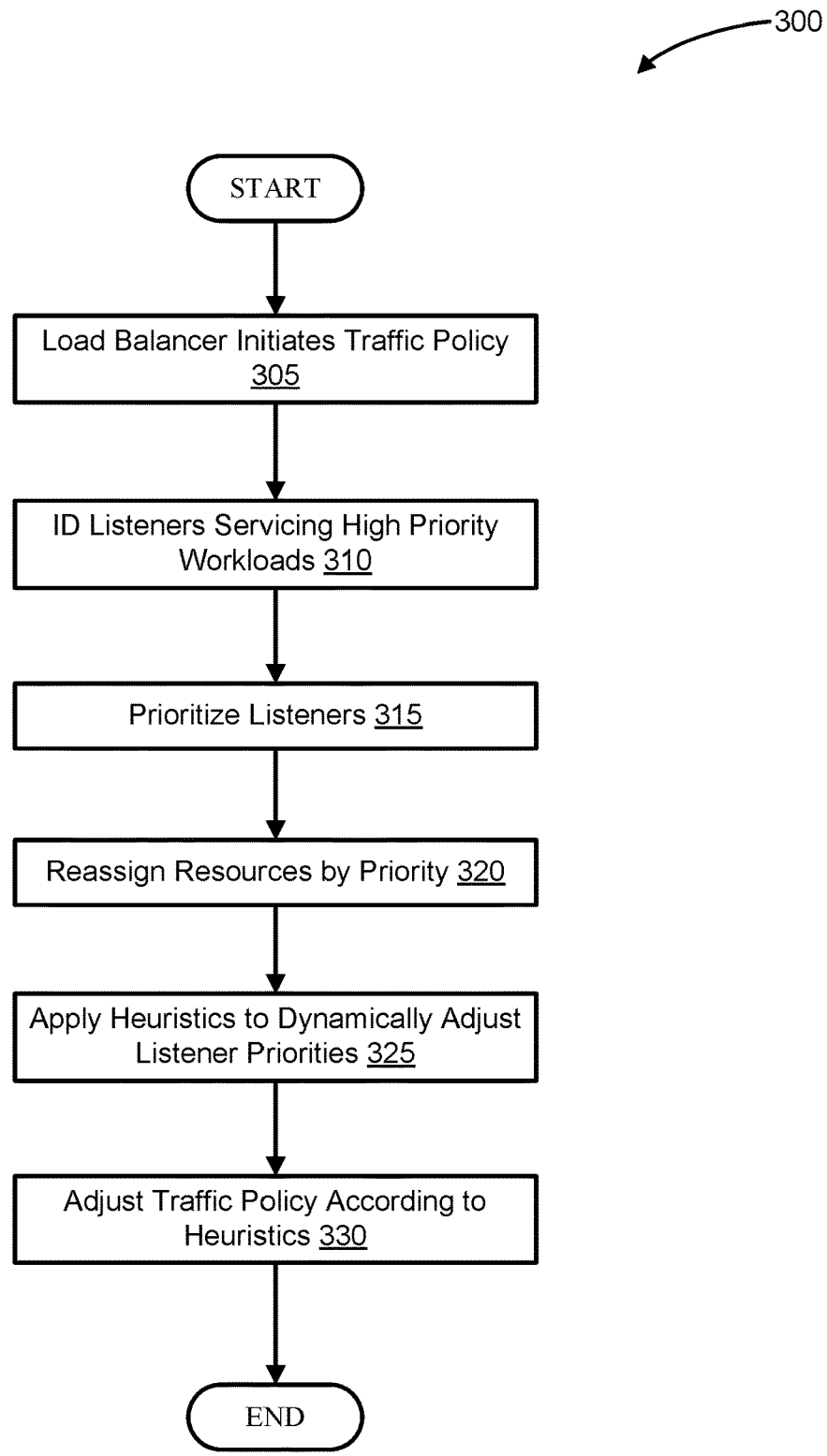
FIG. 3 illustrates a flowchart of a method for an elastic load balancer service to apply priorities to listeners handling high priority applications, according to embodiments.

Referring now to FIG. 3, illustrated is a flowchart of a method 300 for an elastic load balancer service to apply priorities to listeners handling high priority applications, according to embodiments. In some embodiments, once an application has been executed in an elastic load balancing environment, the ELB must apply and adjust policies to dynamically balance workloads. Such balancing may be accomplished by focusing on the listeners at the ELB.

At 305, the ELB may initiate a traffic policy (also referred to as a network traffic policy). As discussed herein, a traffic policy may manage workloads based on the business imperatives of the user/application owner. The traffic policy may define, for example, a general level of priority for a given application, the percentage of system capacity the application is entitled to, the parameters for expansion (e.g., scaling up) that the ELB may implement to support an application with a high priority, the percentage of system capacity that may be held in "burst" reserve for a given application (e.g., the amount of system capacity held in "burst" reserve for a particular application, as opposed to the "burst" reserve for the entire back-end pool), and the periods of time when an application may experience increased demand or when the application may be critical/necessary to meet business imperatives.

At 310, the listeners that are servicing applications with high priorities are identified. As discussed herein, listeners at the ELB may be managing connections to particular instances associated with particular applications.

At 315, the listeners are prioritized. In embodiments, listeners may be prioritized according the priority of the applications they service, as described herein.

At 320, resources are reassigned among the applications, according to listener priority. To facilitate streamlined communication, resources that have been allocated to particular applications may be bound to the listeners that serve said applications, as described herein.

At 325, heuristics may be applied to dynamically adjust the listener priorities. Heuristics may be described in further detail in the description of FIG. 4.

At 330, the network traffic policy may be adjusted according to the heuristics. In embodiments, the ELB may adjust its network traffic policy to specifically route communications related to particular applications through the listeners that are similarly prioritized. This may prevent bottlenecking for the communications related to high priority applications.

Figure 4:
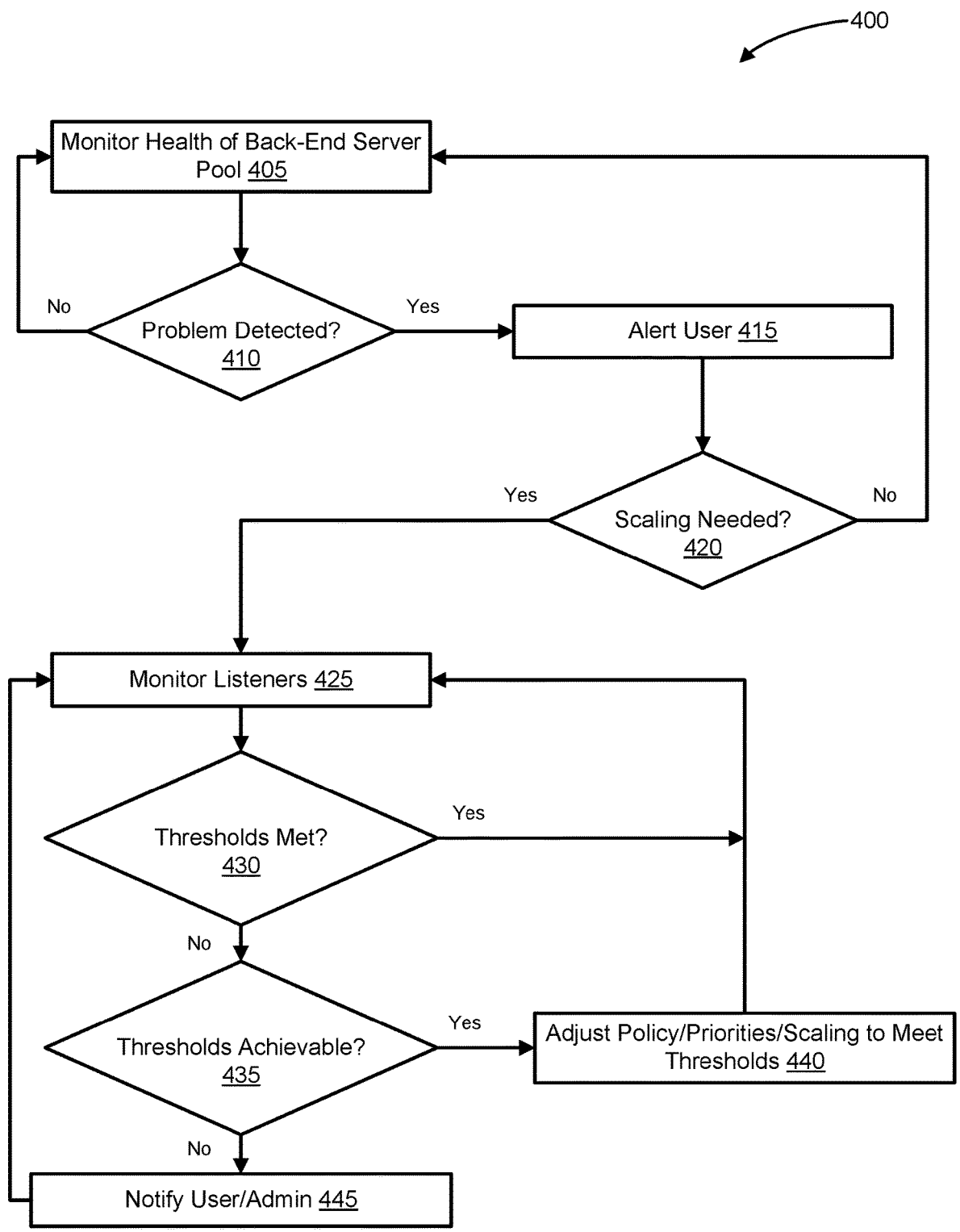
FIG. 4 illustrates a flowchart of a method for dynamically managing traffic policies and priorities, according to embodiments.

Referring now to FIG. 4, illustrated is a flowchart of a method 400 for dynamically managing traffic policies and priorities, according to embodiments. At 405, the health of the servers in the back-end pool is monitored. Health monitoring may include, for example, monitoring the run-time characteristics and/or performance levels of nodes in the back-end pool, as well as the performance of the hardware components in the physical servers that are used to support the virtualized instances on the nodes.

At 410, it is determined whether a problem has been detected. Problems may include the failure of a node or piece of hardware, severance of a communications connection, drops in performance of virtualized systems, drops in performance of physical systems, etc. For example, a problem may be detected when an entire node fails, causing performance of said node to drop to zero. In other embodiments, a drop in performance below a percentage of total performance capability may be a "problem" to be detected. In other embodiments, a drop in relative performance (e.g., a sudden, unexpected drop from 90% performance to 40% performance) may trigger a "problem" detection event. Problems may further include the inability of the node to handle the incoming traffic or workload, or to meet the business imperatives of a user. For example, a node may be operating at near peak efficiency/performance while a backlog of communications/requests begins to form. In other embodiments, a problem may include a detected of wasted resources (e.g., a node that has not exceeded a relatively low percentage of efficiency/performance for a given period of time).

If, at 410, a problem is detected, a user is alerted at 415 that the problem has been detected. User alerts may include pop-up windows, text/SMS alerts, e-mails, audio recording sent to a user's voicemail, etc. In embodiments, an admin may also be alerted.

At 420, it is determined whether scaling is needed to overcome the problem. For example, when the detected problem includes a buildup of traffic backlog, scaling up to accommodate the increased traffic may provide a solution to the problem. Alternatively, when the problem includes wasted resources, scaling down may free up resources for other nodes/applications.

If, at 420, it is determined that scaling is needed, then at 425, listeners are monitored. In embodiments, as described regarding FIG. 3, listeners may be bound to particular nodes or applications. As such, monitoring the listeners may provide an effective and quick means of determining traffic levels and whether the nodes are performing to expectations. In embodiments, it may further allow a determination as to whether thresholds are being met and/or whether policies/prioritizations should be adjusted to meet the user's expectations and business imperatives.

At 430, it is determined whether the thresholds are being met. The thresholds may be defined directly by a user, or they may be inferred based on a policy or list of business imperatives provided. For example, if a user wishes to prioritize a gaming application X, because application X drives critical revenue for the user, a threshold may be set to ensure that the nodes bound to the listeners servicing traffic related to application X have ample resources to prevent traffic backlogs and otherwise ensure the smooth operation of application X.

In embodiments, business imperatives that inform the thresholds may be dynamic in natures. For example, a user may wish to prioritize their applications according to certain percentages now, but may also wish those percentages to change over time. For example, a user may desire the current prioritizations (which may be reflective and/or based on the user's business imperatives) to include application A at 50%, application B at 30%, and application C at 20%. The user may further anticipate that applications A and C will expand over the next few months, and that the prioritizations will eventually include application A at 65%, application B at 10%, and application C at 25%. In such a case, the thresholds may gradually scale with the changing business imperatives/priorities.

If, at 430, it is determined that thresholds are not being met, it is then determined, at 435, whether the thresholds can be achieved using the current computing environment. For example, it may be determined that the thresholds could be met with a rearrangement of the resources in the back-end pool.

If, at 435, it is determined that the thresholds cannot be met, the user and/or admin are notified at 445. This may occur when the back-end pool is operating at capacity, when an unexpected failure occurs, when a traffic spike occurs, etc. In embodiments, this may trigger a hot migration of an application, or node servicing the application, to a second computing environment with the resources necessary to accommodate the needed level of service.

However, if, at 435, it is determined that the current computing environment can potentially achieve the threshold, the application prioritizations, network traffic policies, or the scaling of the back-end pool may be adjusted to achieve the threshold(s). Actions to be taken to resolve unmet thresholds may be described by heuristics. In embodiments, heuristics may include, for example, changing an underutilized application's priorities, for a limited time, to free up resources for other applications that may be experiencing an unusually high level of traffic. In other embodiments, adjusting network traffic policies at the ELB may provide a solution; for example when a listener has failed, the ELB may reroute traffic through a different listener/port. In yet other embodiments, scaling of the backend pool, if possible, may redistribute resources among the nodes, allowing them to provide better support to the applications running thereon.

Figure 5:
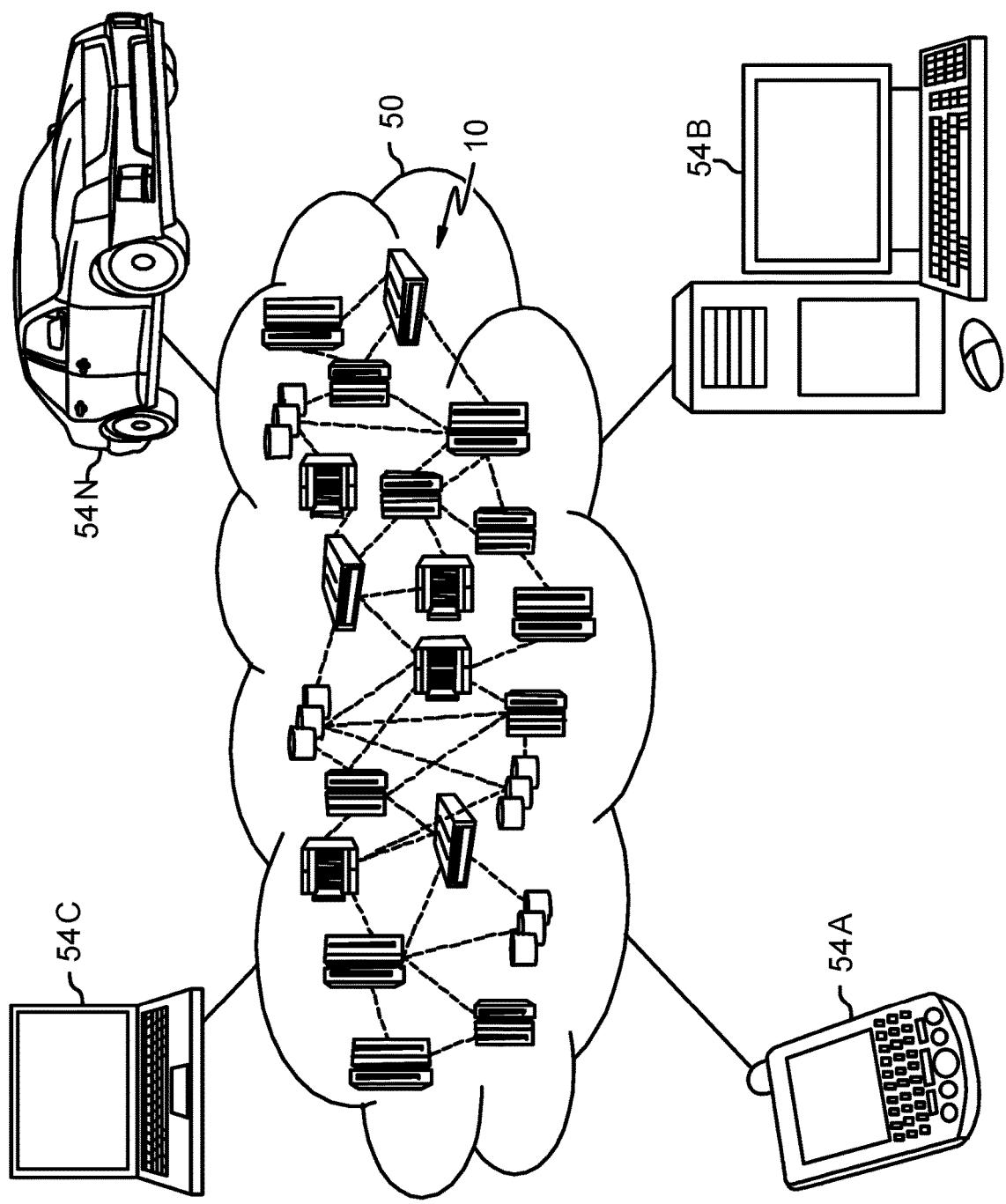
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
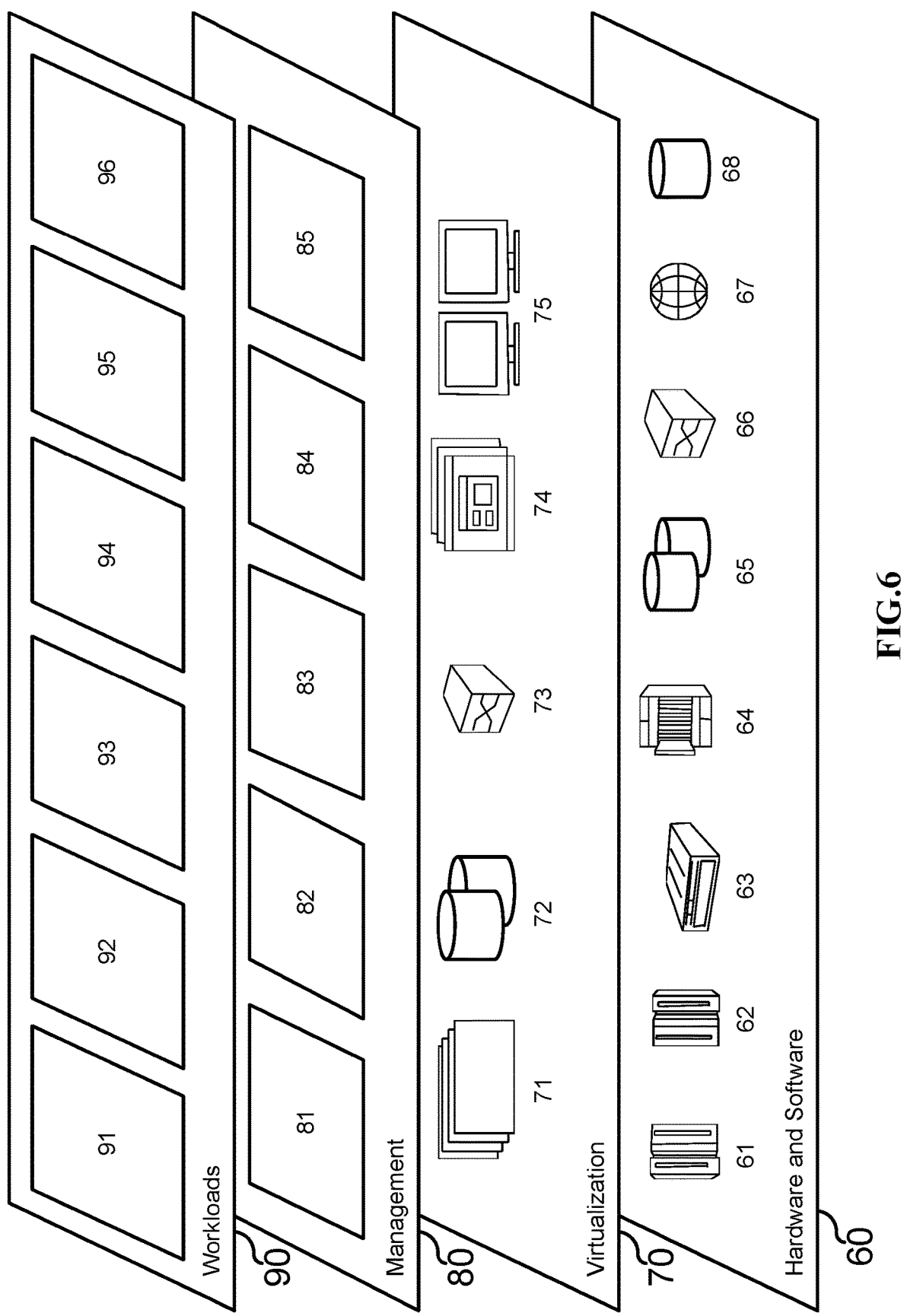
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and elastic load balancing prioritization 96.

Figure 7:
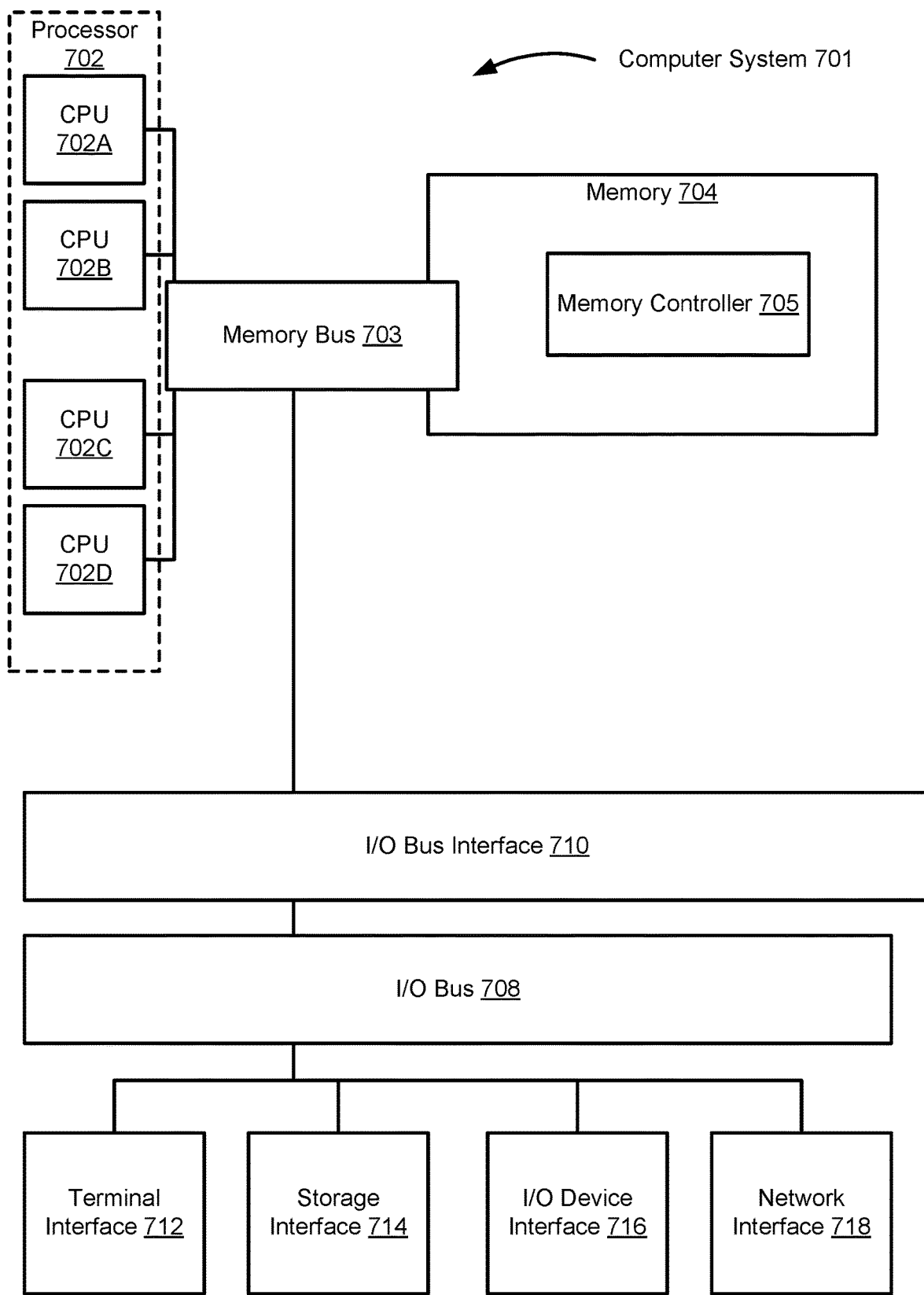
FIG. 7 depicts a high-level block diagram of an example computer system that may be used in implementing embodiments of the present disclosure.

Referring now to FIG. 7, shown is a high-level block diagram of an example computer system (e.g., computer) 701 that may be configured to perform various aspects of the present disclosure, including, for example, methods 200/300/400, described in FIGS. 2/3/4. The example computer system 701 may be used in implementing one or more of the methods or modules, and any related functions or operations, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may comprise one or more levels of on-board cache.

In some embodiments, the memory subsystem 704 may comprise a random-access semiconductor memory, storage device, or storage medium (either volatile or non-volatile) for storing data and programs. In some embodiments, the memory subsystem 704 may represent the entire virtual memory of the computer system 701, and may also include the virtual memory of other computer systems coupled to the computer system 701 or connected via a network. The memory subsystem 704 may be conceptually a single monolithic entity, but, in some embodiments, the memory subsystem 704 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 704 may contain elements for control and flow of memory used by the CPU 702. This may include a memory controller 705.

Although the memory bus 703 is shown in FIG. 7 as a single bus structure providing a direct communication path among the CPUs 702, the memory subsystem 704, and the I/O bus interface 710, the memory bus 703 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, mobile device, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for workload balancing in an elastic load balancing environment, the method comprising:
    deploying one or more applications;
    defining a priority for a first application of the one or more applications;
    assigning a set of dynamic resources to the first application;
    configuring a set of burst reserves for the first application;
    configuring a schedule for the priority for the first application;
    configuring an elastic load balancer to manage the workload of the first application, according to the priority and the schedule for the priority, and using the set of dynamic resources and burst reserves;
    executing the one or more applications;
    identifying a set of listeners, the set of listeners servicing a set of high priority workloads among the one or more applications, according to a network traffic policy;
    reassigning, according to a prioritization, at least a portion of the set of dynamic resources to the one or more applications;
    applying a set of heuristics to dynamically adjust the prioritization of the set of listeners; and
    adjusting the network traffic policy and the set of dynamic resources according to the heuristics.

2. The method of claim 1, wherein the network traffic policy includes:
    a subset of heuristics collected in a virtualized network, wherein the subset of heuristics represents less than the total workload on a physical network associated with the virtualized network; and
    adjusting heuristics, according to a set of business imperatives.

3. The method of claim 1, wherein at least one heuristic includes:
    monitoring a health characteristic of a back-end server pool in the elastic load balancing environment;
    detecting a problem related to the health characteristic;
    alerting a user of the problem; and
    mitigating the problem.

4. The method of claim 3, wherein mitigating the problem includes:
    determining that the back-end server pool requires scaling;
    in response to determining that the back-end server pool requires scaling, monitoring the set of listeners to determine whether a threshold has not been met, the threshold reflecting a business imperative;
    determining that the threshold has not been met;
    determining that the threshold is achievable;

adjusting the network traffic policy and the prioritization to achieve the threshold.

5. The method of claim 3, wherein mitigating the problem includes performing a migration of a virtual instance of an application from a first node to a second node of the back-end server pool.

6. The method of claim 1, wherein the heuristics includes:
monitoring the elastic load balancer and a set of business imperatives; and
in response to a change in the set of business imperatives, adjusting the set of dynamic resources and the network policy, via the elastic load balancer, to achieve a business imperative threshold.

7. The method of claim 3, wherein the at least one threshold is not achievable, further comprising:
prioritizing the one or more applications to minimize disruptions to the set of high priority workloads.

8. A system for workload balancing in an elastic load balancing environment, the system comprising:
a memory with program instructions stored thereon; and
a processor in communication with the memory, wherein the system is configured to execute a set of actions, comprising:
deploying one or more applications;
defining a priority for a first application of the one or more applications;
assigning a set of dynamic resources to the first application;
configuring a set of burst reserves for the first application;
configuring a schedule for the priority for the first application;
configuring an elastic load balancer to manage the workload of the first application, according to the priority and the schedule for the priority, and using the set of dynamic resources and burst reserves;
executing the one or more applications;
identifying a set of listeners, the set of listeners servicing a set of high priority workloads among the one or more applications, according to a network traffic policy;
reassigning, according to a prioritization, at least a portion of the set of dynamic resources to the one or more applications;
applying a set of heuristics to dynamically adjust the prioritization of the set of listeners; and
adjusting the network traffic policy and the set of dynamic resources according to the heuristics.

9. The system of claim 8, wherein at least one heuristic includes:
monitoring a health characteristic of a back-end server pool in the elastic load balancing environment;
detecting a problem related to the health characteristic;
alerting a user of the problem; and
mitigating the problem.

10. The system of claim 9, wherein mitigating the problem includes:
determining that the back-end server pool requires scaling;
in response to determining that the back-end server pool requires scaling, monitoring the set of listeners to determine whether a threshold has not been met, the threshold reflecting a business imperative;
determining that the threshold has not been met;
determining that the threshold is achievable;
adjusting the network traffic policy and the prioritization to achieve the threshold.

11. The system of claim 9, wherein mitigating the problem includes performing a migration of a virtual instance of an application from a first node to a second node of the back-end server pool.

12. The system of claim 9, wherein the at least one threshold is not achievable, further comprising:
prioritizing the one or more applications to minimize disruptions to the set of high priority workloads.

13. The system of claim 8, wherein software is provided as a service in a cloud environment to execute the set of actions.

14. A computer program product for workload balancing in an elastic load balancing environment, the computer program product comprising a computer readable storage medium having program instructions embodied therewith, the program instructions executable by a device to cause the device to execute a set of actions, comprising:
deploying one or more applications;
defining a priority for a first application of the one or more applications;
assigning a set of dynamic resources to the first application;
configuring a set of burst reserves for the first application;
configuring a schedule for the priority for the first application;
configuring an elastic load balancer to manage the workload of the first application, according to the priority and the schedule for the priority;
using the set of dynamic resources and burst reserves; and
executing the one or more applications
identifying a set of listeners, the set of listeners servicing a set of high priority workloads among the one or more applications, according to a network traffic policy;
reassigning, according to a prioritization, at least a portion of the set of dynamic resources to the one or more applications;
applying a set of heuristics to dynamically adjust the prioritization of the set of listeners; and
adjusting the network traffic policy and the set of dynamic resources according to the heuristics.

15. The computer program product of claim 14, wherein at least one heuristic includes:
monitoring a health characteristic of a back-end server pool in the elastic load balancing environment;
detecting a problem related to the health characteristic;
alerting a user of the problem; and
mitigating the problem.

16. The computer program product of claim 15, wherein mitigating the problem includes:
determining that the back-end server pool requires scaling;
in response to determining that the back-end server pool requires scaling, monitoring the set of listeners to determine whether a threshold has not been met, the threshold reflecting a business imperative;
determining that the threshold has not been met;
determining that the threshold is achievable;
adjusting the network traffic policy and the prioritization to achieve the threshold.

17. The computer program product of claim 15, wherein mitigating the problem includes performing a migration of a virtual instance of an application from a first node to a second node of the back-end server pool.

* * * * *